United States Patent
Ko

(10) Patent No.: US 8,620,358 B2
(45) Date of Patent: Dec. 31, 2013

(54) METHOD AND APPARATUS FOR DIAL INPUT USING VOICE IN A MOBILE TERMINAL

(75) Inventor: Myung-Woo Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 12/861,244

(22) Filed: Aug. 23, 2010

(65) Prior Publication Data

US 2011/0045814 A1 Feb. 24, 2011

(30) Foreign Application Priority Data

Aug. 24, 2009 (KR) .................. 10-2009-0078050

(51) Int. Cl.
*H04B 1/38* (2006.01)

(52) U.S. Cl.
USPC .............. 455/463; 455/564; 379/88.01

(58) Field of Classification Search
USPC ........... 455/550.1, 563–567, 403; 379/216, 379/88.01–88.04, 216.01
See application file for complete search history.

(56) References Cited

U.S. PATENT DOCUMENTS

| | | | |
|---|---|---|---|
| 6,862,463 B1* | 3/2005 | Nilsson ..................... 455/564 |
| 6,928,155 B1* | 8/2005 | Knitl et al. ............. 379/265.01 |
| 7,489,767 B2* | 2/2009 | Hikishima ............... 379/88.14 |
| 7,864,929 B2* | 1/2011 | Carro ...................... 379/88.04 |
| 7,903,793 B2* | 3/2011 | Visser ..................... 379/88.01 |
| 2001/0010683 A1* | 8/2001 | Otani ......................... 370/265 |
| 2002/0126821 A1* | 9/2002 | Barak et al. ................. 379/219 |
| 2002/0165011 A1* | 11/2002 | Shi et al. .................... 455/564 |
| 2003/0053446 A1* | 3/2003 | Kwon ........................ 370/352 |
| 2003/0189642 A1* | 10/2003 | Bean et al. ............... 348/207.1 |
| 2004/0174976 A1* | 9/2004 | Elliott .................... 379/211.01 |
| 2004/0185895 A1* | 9/2004 | Aisenberg ............... 455/550.1 |
| 2005/0186945 A1* | 8/2005 | Mazor ......................... 455/413 |
| 2005/0265524 A1* | 12/2005 | Vollkommer et al. ..... 379/88.1 |
| 2006/0135137 A1* | 6/2006 | Chung ........................ 455/415 |
| 2006/0233326 A1* | 10/2006 | Erhart et al. ............. 379/88.16 |
| 2007/0081661 A1* | 4/2007 | Korah et al. ........... 379/355.01 |
| 2007/0263796 A1* | 11/2007 | Patel et al. ............... 379/88.01 |
| 2008/0139228 A1* | 6/2008 | Raffel et al. ................ 455/466 |
| 2010/0058068 A1* | 3/2010 | Perkins et al. .............. 713/184 |

\* cited by examiner

*Primary Examiner* — Dominic E Rego
(74) *Attorney, Agent, or Firm* — Jefferson IP Law, LLP

(57) ABSTRACT

A method and apparatus for dial input using a voice in a mobile terminal are provided. The method includes recognizing a voice inputted from a microphone when a call is connected, identifying a numeral corresponding to the recognized voice, and transmitting the identified numeral to a phone number to which the call is connected.

12 Claims, 2 Drawing Sheets

METHOD AND APPARATUS FOR DIAL INPUT USING VOICE IN A MOBILE TERMINAL

PRIORITY

This application claims the benefit under 35 U.S.C. §119(a) of a Korean patent application filed in the Korean Intellectual Property Office on Aug. 24, 2009 and assigned Serial No. 10-2009-0078050, the entire disclosure of which is hereby incorporated by reference.

BACKGROUND OF THE INVENTION

1. Field of the Invention

The present invention relates to a method and apparatus for dial input using a voice in a mobile communication terminal. More particularly, the present invention relates to a method and apparatus for inputting a dial using a voice in a mobile communication system at the time of automatic guidance telephony.

2. Description of the Related Art

The development of communication technology has lead to the advent of an automatic guidance system for automatically answering the phone or automatically servicing various kinds of information by voice during a user's absence. For example, a service provider or a public institution may employ an Automatic Response System (ARS). The ARS classifies various kinds of services and maps the classified services to specific numbers. When the ARS receives a call, voice prompts are transmitted to guide a user that made the call to select a number corresponding to the various kinds of services. In response to the user's selection, a service corresponding to the selected number is provided. The ARS is installed in facilities such as a bank, a firm, a hospital, a public institution, etc. and in response to a user's call, automatically guides a service provided from a corresponding facility and providing various kinds of information.

The ARS operates in a scheme in which a user who makes a call enters a desired service by listening to a guide for various kinds of services and corresponding numbers and inputting a specific number through a keypad or touch screen of a terminal. However, the above scheme is disadvantageous in that, while making a call, the user has to reposition the terminal to see the keypad or touch screen of the terminal and, after inputting a desired number, return the terminal to the user's ear. In the case of touch screen phones, there is a problem in that the user has to carry out more complex operations in order to input a desired number. For example, during an automatic guidance service, if the user listens to a guidance message of "Press a number corresponding to a desired service" through the touch phone, in order to enter the desired service, the user has to reposition the phone to enter the number, unlock a locked key in the phone, input the corresponding number through the touch screen, and lock the unlocked key again. If the user makes an error in this process, the user may be required to repeat the process again from the beginning. While this problem is especially apparent with touch screen phones, phones having a keypad also suffer from this inconvenience.

SUMMARY OF THE INVENTION

An aspect of the present invention is to address at least the above-mentioned problems and/or disadvantages and to provide at least the advantages below. Accordingly, an aspect of the present invention is to provide a method and apparatus for dial input using a voice in a mobile communication terminal.

Another aspect of the present invention is to provide a method and apparatus for inputting a dial using a voice in a mobile communication terminal upon connecting with an Automatic Response System (ARS).

The above aspects are addressed by providing a method and apparatus for dial input using a voice in a mobile communication terminal.

In accordance with an aspect of the present invention, a method for dial input using a voice in a mobile communication terminal is provided. The method includes recognizing a voice inputted from a microphone when a call is connected, identifying a numeral corresponding to the recognized voice, and transmitting the identified numeral to a phone number to which the call is connected.

In accordance with another aspect of the present invention, an apparatus for dial input using a voice in a mobile communication terminal is provided. The apparatus includes a microphone, a controller, and a transceiver. The microphone receives a voice when a call is connected. The controller recognizes a voice inputted from the microphone and identifies a numeral corresponding to the recognized voice. The transceiver transmits the identified numeral to a phone number to which the call is connected.

In accordance with another aspect of the present invention, A method of simplifying input of an alphanumeric character during a telephone call between a user and at least one called party, the method comprising: while a telephone call is occurring, receiving an input signal indicating that a numeral is to be input, receiving a voice communication from the user, identifying an alphanumeric character corresponding to the voice communication, generating a signal corresponding to the alphanumeric character, and transmitting the signal corresponding to the alphanumeric character to the at least one called party instead of the voice communication.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The following description is made for a method and apparatus for, upon connecting with an Automatic Response System (ARS), inputting an alphanumeric character using a voice in a mobile communication terminal according to exemplary embodiments of the present invention. The mobile communication terminal includes terminals with and without a touch screen. A telephone call as used herein may refer to audio communication between the user and at least one called party, including audio-only or audio and video communication. The communication may occur over a conventional telephone system, a cellular network, wireless network, wired network, and/or the Internet. Although the exemplary embodiments described herein refer to the generation of a signal corresponding to a numeral (e.g., '0'-'9'), additional exemplary embodiments generate a signal corresponding to any alphanumeric character (e.g., 'a'-'z' in addition to '0'-'9').

Figure 1:
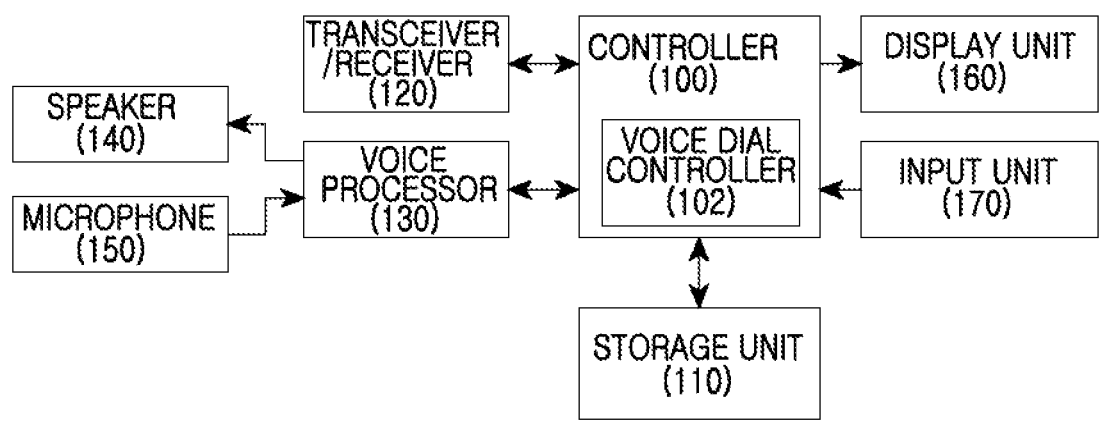
FIG. 1 is a block diagram illustrating a construction of a mobile communication terminal according to an exemplary embodiment of the present invention.

FIG. 1 is a block diagram illustrating a construction of a mobile communication terminal according to an exemplary embodiment of the present invention.

Referring to FIG. 1, the mobile communication terminal includes a controller 100, a storage unit 110, a transceiver 120, a voice processor 130, a speaker 140, a microphone 150, a display unit 160, and an input unit 170. The controller 100 includes a voice dial controller 102. The mobile communication terminal may include additional and/or different units. Similarly, the functionality of two or more of the above units may be integrated into a single component.

The controller 100 controls and processes a general operation of the mobile communication terminal. The controller 100 includes the voice dial controller 102 and thus, controls and processes a function for switching to a voice dial mode and inputting a numeral corresponding to a voice inputted through the microphone 150 when a voice dial key is inputted. The voice dial mode refers to a mode for recognizing the inputted voice through a voice recognition algorithm and determining a corresponding numeral without transmitting a voice inputted through the microphone 150 to a called terminal.

When a signal representing a voice dial key is inputted through the input unit 170, the voice dial controller 102 enters the voice dial mode, recognizes a voice inputted from the microphone 150, and determines a numeral corresponding to the inputted voice. The voice dial controller 102 analyzes a pattern of the inputted voice through the voice recognition algorithm, identifies a numeral mapped to the pattern of the voice in a previously stored voice dial table, and determines the identified numeral as a numeral corresponding to the voice.

If the numeral corresponding to the voice is determined, the voice dial controller 102 performs the same function as if a key corresponding to the numeral were pressed. The voice dial controller 102 may control the transceiver 120 to transmit the numeral corresponding to the voice to a called terminal, and may control the display unit 160 to display the numeral on a screen as well.

The storage unit 110 stores various kinds of programs and data necessary for an operation of the terminal. The storage unit 110 stores the voice dial table according to exemplary embodiments of the present invention. The voice dial table is a table representing a mapping relation between respective numerals and voice patterns, and may be generated and stored beforehand or may be generated and stored through recognizing a user's voice for each numeral.

The transceiver 120 transmits, receives, and processes a wireless signal of data input/output through an antenna (not shown). The transceiver 120 transmits a numeral corresponding to a voice to a called terminal under control of the controller 100.

The voice processor 130, and the speaker 140 and microphone 150 connecting to the voice processor 130, are examples of a voice input/output block that is used for telephone call and voice record. The voice processor 130 converts Pulse Code Modulation (PCM) data provided from the controller 100 into an analog voice signal and transmits the analog voice signal through the speaker 140, and converts a voice signal received through the microphone 150 into PCM data and provides the PCM data to the controller 100.

The display unit 160 displays various information, including state information generated during an operation of the mobile communication terminal, numerals, and characters. According to exemplary embodiments of the present invention, the display unit 160 displays a numeral corresponding to a voice on a screen in accordance with the controller 100.

The input unit 170 includes a plurality of function keys and provides data to the controller 100 corresponding to a key pressed by a user. The input unit 170 includes a key for entering a voice dial mode and, when the key is inputted, provides a signal representing that a voice dial key is inputted to the controller 100. The voice dial key may be a key not used for a telephone call in the terminal. The voice dial key may perform a role for entering a voice dial mode when the mobile communication terminal is operating in a call mode. However, when the mobile communication terminal is not operating in the telephone call mode, the voice dial key may perform other functions (e.g., Cancel, Up/Down/Left/Right movement, Broadcast access, MP3 play, etc.).

Figure 2:
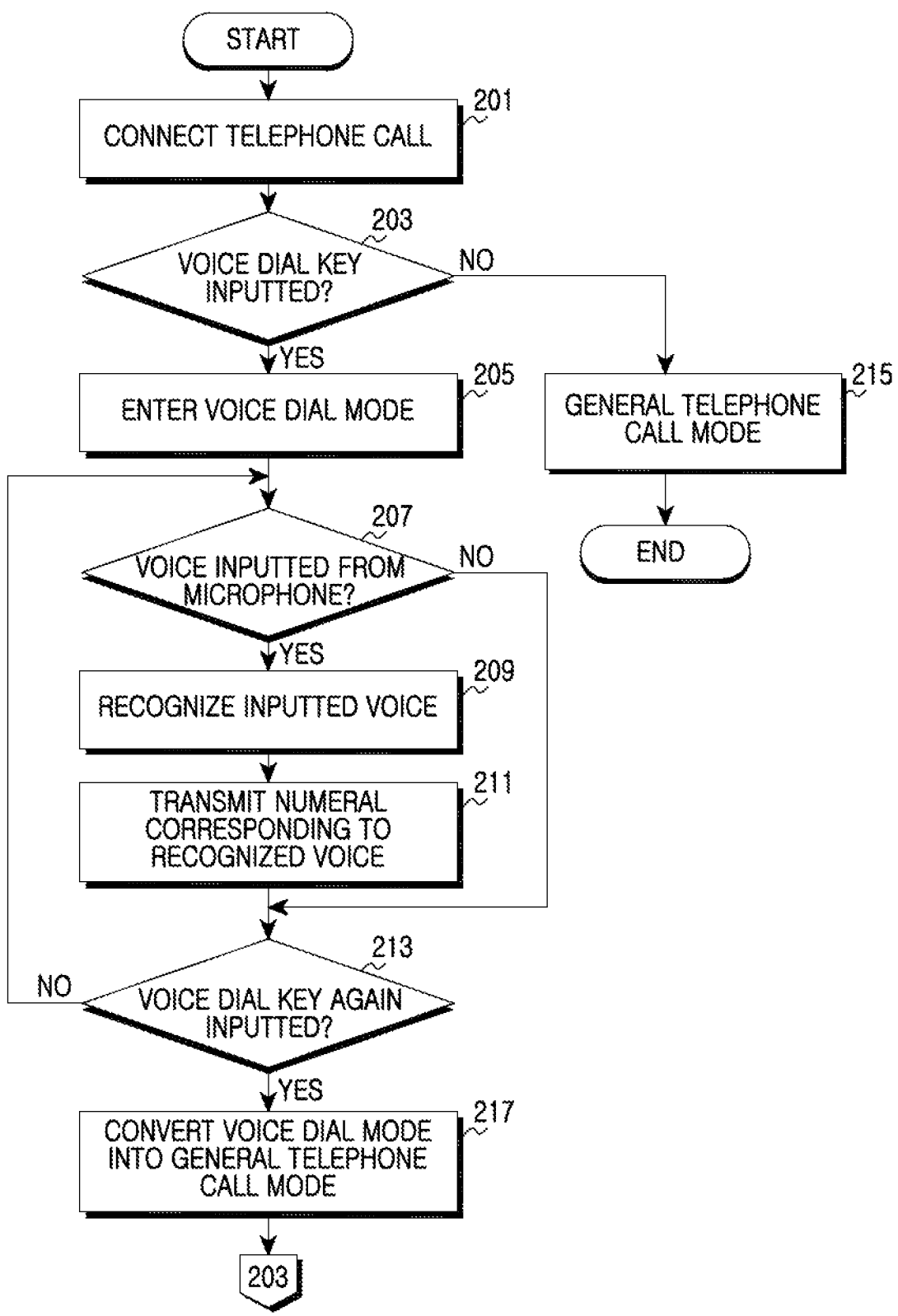
FIG. 2 is a flow diagram illustrating a procedure of inputting a dial using a voice in a mobile communication terminal according to an exemplary embodiment of the present invention.

FIG. 2 illustrates a procedure of inputting a dial using a voice in a mobile communication terminal according to an exemplary embodiment of the present invention.

Referring to FIG. 2, if a telephone call is connected for a specific phone number in step 201, the mobile communication terminal proceeds to step 203 and determines whether a voice dial key is inputted. The voice dial key may be inputted by a user when an automatic guidance service is provided from a called terminal. The voice dial key can be a key not used for a telephone call in the mobile communication terminal.

If the voice dial key is not inputted, the mobile communication terminal proceeds to step 215 and performs a general telephone call mode and then, terminates the procedure. The general telephone call mode refers to a mode of transmitting a voice signal inputted from the microphone 150 to a called terminal corresponding to a called phone number, and performing a telephone call.

If the voice dial key is inputted in step 203, the mobile communication terminal proceeds to step 205 and enters a voice dial mode. The mobile communication terminal can control a voice inputted through the microphone 150 in order not to be transmitted to the called terminal, and perform a preparation process for recognizing the inputted voice.

In step 207, the mobile communication terminal determines whether a voice is inputted from the microphone 150. If the voice is not inputted from the microphone 150, the mobile communication terminal jumps to step 213 below.

If the voice is inputted from the microphone 150 in step 207, the mobile communication terminal proceeds to step 209 and executes a voice recognition algorithm to recognize the inputted voice. In step 211, the mobile communication terminal identifies a numeral corresponding to the recognized voice and then, transmits the identified numeral to the called terminal. The mobile communication terminal analyzes a pattern of the inputted voice, identifies a numeral mapped to the pattern of the voice in a previously stored voice dial table, and transmits the identified numeral to the called terminal. The mobile communication terminal may display the identified numeral on the display unit 160 to enable the user to determine whether a numeral corresponding to a voice is correctly transmitted.

In step 213, the mobile communication terminal determines whether the voice dial key is inputted again. If the voice dial key is not again inputted, the mobile communication terminal repeats the procedure from step 207. If the voice dial key is inputted again, the mobile communication terminal proceeds to step 217 and converts the voice dial mode into the general telephone call mode. The mobile communication terminal repeats the process from step 203.

As described above, when a voice dial key is first inputted, a mobile communication terminal enters a voice dial mode and performs an operation of transmitting a numeral through voice recognition and, when the voice dial key is again inputted, terminates the voice dial mode. According to other exemplary embodiments, the voice dial mode may be enabled only while the voice dial key is inputted. If the voice dial key is pressed during a predetermined time, the mobile communication terminal may perform the voice dial mode only during the predetermined time for which the press is sustained. In this case, the same key or different keys may be used for entering and terminating the voice dial mode.

According to an exemplary embodiment of the present invention, upon connecting with an ARS, a dial using a voice in a mobile communication terminal is input, and an operation of seeing a keypad or touch screen of the terminal in use is omitted, and, in the case of a touch screen phone, an operation of turning on/off a key lock function is also omitted, thereby making convenient use of the ARS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for dial input using a voice in a mobile terminal, the method comprising:
   determining whether a predetermined voice dial key is inputted to transmit a numeral instead of an inputted voice while a call is connected to an Automatic Response System (ARS) of a called party;
   if the predetermined voice dial key is inputted, switching from a general telephone call mode to a voice dial mode;
   transmitting a numeral corresponding to the voice inputted from the microphone during the voice dial mode;
   if the predetermined voice dial key is inputted again, switching from the voice dial mode to the general telephone call mode; and
   transmitting an audio signal corresponding to the voice inputted from the microphone during the general telephone mode.

2. The method of claim 1, wherein the voice dial mode is a mode for transmitting the numeral corresponding to the inputted voice to the ARS to which the call is connected without transmitting the inputted voice to the ARS to which the call is connected.

3. The method of claim 1, wherein the transmitting of the numeral corresponding to the inputted voice comprises:
   recognizing a pattern of the voice; and
   identifying a numeral mapped to a recognized pattern in a previously stored table representing a mapping relation between respective numerals and voice patterns.

4. The method of claim 1, further comprising displaying the identified numeral on a screen.

5. An apparatus for dial input using a voice in a mobile terminal, the apparatus comprising:
   a microphone for receiving a voice while a call is connected to an Automatic Response System (ARS) of a called party;
   an input unit comprising a voice dial key;
   a controller for determining whether a predetermined voice dial key is inputted to transmit a numeral instead of an inputted voice while the call is connected, for sensing if the voice dial key is inputted, for controlling to switch between a general telephone call mode and a voice dial mode according to the sensed result, for controlling to transmit a numeral corresponding to the inputted voice during the voice dial mode and for controlling to transmit an audio signal corresponding to the inputted voice during the general telephone call mode; and
   a transceiver for transmitting at least one of the numeral and the audio signal to the connected ARS while the call is connected.

6. The apparatus of claim 5, wherein if a predetermined voice dial key is inputted, the controller controls to switching from the general telephone call mode to the voice dial mode, and if a predetermined voice dial key is inputted again, the controller controls to switching from the voice dial mode to the general telephone call mode,
   wherein the voice dial mode is a mode for transmitting the numeral corresponding to the inputted voice to the connected ARS to which the call is connected without transmitting the inputted voice to the connected ARS to which the call is connected.

7. The apparatus of claim 5, further comprising:
   a storage unit for storing a table representing a mapping relation between respective numerals and voice patterns,
   wherein the controller recognizes a pattern of the voice, and identifies a numeral mapped to the recognized pattern in a table.

8. The apparatus of claim 5, further comprising a display unit for displaying the identified numeral on a screen.

9. A method of simplifying input of an alphanumeric character during a telephone call between a user and a called party, the method comprising:
   while a telephone call is connecting with an Automatic Response System (ARS) of the called party, receiving an input signal from a first key for entering a voice dial mode, indicating that a numeral is to be transmitted instead of voice transmission;

identifying an alphanumeric character corresponding to the voice communication received from the user during the voice dial mode;

transmitting a signal corresponding to the alphanumeric character to the connected ARS during the voice dial mode;

receiving another input signal from a second key for switching from the voice dial mode to a general telephone call mode; and transmitting an audio signal corresponding to a voice communication received from the user during the general telephone call mode.

10. The method of claim 9, further comprising:

continuing to receive the voice communication, to identify the numeral, and to transmit the signal until receiving the another input signal indicating that numerals are no longer being input.

11. The method of claim 9, further comprising:

displaying the identified numeral on a screen of the user's communication terminal.

12. The method of claim 9, wherein the alphanumeric character is a numeral.

* * * * *